United States Patent [19]

Ohuchi et al.

[11] Patent Number: 5,313,507
[45] Date of Patent: May 17, 1994

[54] APPARATUS FOR ATTACHING KEY MEMBER TO NUCLEAR FUEL ASSEMBLY GRID AND DETACHING SAME THEREFROM

[75] Inventors: Katsunori Ohuchi; Junichi Oyama; Akio Sando, all of Ibaraki, Japan

[73] Assignee: Mitsubishi Nuclear Fuel Co., Tokyo, Japan

[21] Appl. No.: 972,370

[22] Filed: Nov. 5, 1992

[30] Foreign Application Priority Data

Nov. 8, 1991 [JP] Japan .................................. 3-293438

[51] Int. Cl.$^5$ .............................................. G21C 3/00
[52] U.S. Cl. .................................... 376/462; 376/446; 376/438; 376/260
[58] Field of Search ............... 376/462, 446, 459, 438, 376/260

[56] References Cited

U.S. PATENT DOCUMENTS

| | | | |
|---|---|---|---|
| 4,124,444 | 11/1978 | Jabsen | 376/462 |
| 4,175,000 | 11/1979 | Jabsen | 376/251 |
| 5,061,437 | 10/1991 | Whitt | 376/438 |
| 5,124,116 | 6/1992 | Whitt | 376/438 |

FOREIGN PATENT DOCUMENTS 0196609 10/1986 European Pat. Off. .

*Primary Examiner*—Daniel D. Wasil
*Assistant Examiner*—Frederick H. Voss
*Attorney, Agent, or Firm*—Oblon, Spivak, McClelland, Maier & Neustadt

[57] ABSTRACT

An apparatus for attaching a key member to a nuclear fuel assembly grid and detaching the same therefrom is disclosed. The apparatus includes a supply and recovery mechanism, an inserting and removing mechanism, and a rotating mechanism. The supply and recovery mechanism operates to supply the key member to a prescribed position adjacent to the grid and recover the same. The inserting and removing mechanism is disposed between the supply and recovery mechanism and the grid, and operates to insert the key member supplied from the supply and recovery mechanism into the grid and remove the key member from the grid to recover the same to the supply and recovery mechanism. The rotating mechanism is disposed adjacent to the inserting and removing mechanism, and operates to rotate the key member inserted in the grid in a prescribed direction about the longitudinal axis to attach the same to the grid and rotate the same in a direction opposite to the prescribed direction to detach the same from the grid.

7 Claims, 5 Drawing Sheets

APPARATUS FOR ATTACHING KEY MEMBER TO NUCLEAR FUEL ASSEMBLY GRID AND DETACHING SAME THEREFROM

BACKGROUND ART

The present invention pertains to an apparatus for attaching a key member to a nuclear fuel assembly grid and detaching the same therefrom.

FIG. 4 depicts a known nuclear fuel assembly which includes a pair of top and bottom nozzles 1 and 2 arranged in vertically spaced relation to each other. A plurality of control-rod guide thimbles 3 are arranged so as to extend between the top and bottom nozzles 1 and 2, and fixedly secured thereto. A plurality of grids 4 are arranged on the vertically intermediate portions of the control-rod guide thimbles 3 so as to be vertically spaced from one another.

Each grid 4 is formed as follows. A plurality of straps 7, each of which is in the form of a thin strip sheet and has a plurality of slits 8 formed therein in longitudinally equally spaced relation from one another, are assembled perpendicularly to each other into a grid by mutually fitting the slits 8 thereof to define a number of grid cells 5. Dimples 9 and springs 10 for supporting a fuel rod 6 are formed on the walls defining each grid cell 5, and the fuel rod 6 inserted in the grid cell 5 is supported by being urged to the dimples 9 by the springs 10.

An assembly method of the nuclear fuel assembly thus constructed will next be described.

First, the grids 4 are arranged in equally spaced relation to each other so as to define a prescribed spacing therebetween. The control-rod guide thimbles 3 are then inserted into and fixed to predetermined grid cells 5 of the grids 4, which correspond to each other. The grids 4 are thus supported by the control rod guide thimbles 3. Thereafter, the fuel rods 6 are inserted into the other corresponding grid cells 5 of the grids 4 while bringing the fuel rods 6 into sliding contact with the springs 10 and the dimples 9. In this manner, the fuel rods 6 are fixedly arranged in corresponding grid cells 5 through the springs 10 and the dimples 9. After the completion of insertion of all the fuel rods 6, the top nozzle 1 and the bottom nozzle 2 are securely fixed to the opposite ends of the control-rod guide thimbles 3.

In the conventional assembly method as described above, inasmuch as the fuel rods 6 are inserted into the grid cells 5 of the grids 4 while bringing the fuel rods 6 into sliding contact with the springs 10 and the dimples 9, the outer peripheral surface of each fuel rod 6 may be scratched. Therefore, a method of inserting key members to deflect the springs 10 and subsequently inserting fuel rods while keeping the springs deflected is proposed in order to prevent the scratching. However, since the insertion of the key members is carried out by hands, the work has been labor-intensive, resulting in low efficiency.

SUMMARY OF THE INVENTION

It is therefore the object of the present invention to provide an apparatus for attaching a key member to a nuclear fuel assembly grid and detaching the same therefrom, which enables mechanically-operated attaching and detaching of the key member, so that laborious work by hands can be avoided.

According to the present invention, there is provided an apparatus for attaching a key member to a nuclear fuel assembly grid and detaching the same therefrom, the key member having a longitudinal axis and being adapted to be detachably attached to the grid by rotating the same about the longitudinal axis, the apparatus comprising:

(a) supply and recovery means for supplying the key member to a prescribed position adjacent to the grid and recovering the same;

(b) inserting and removing means disposed between the supply and recovery means and the grid for inserting the key member supplied from the supply and recovery means into the grid and removing the key member from the grid to recover the same to the supply and recovery means; and (c) rotating means disposed adjacent to the inserting and removing means for rotating the key member inserted in the grid in a prescribed direction about the longitudinal axis to attach the same to the grid and rotating the same in a direction opposite to the prescribed direction to detach the same from the grid.

DETAILED DESCRIPTION OF THE INVENTION

Figure 1:
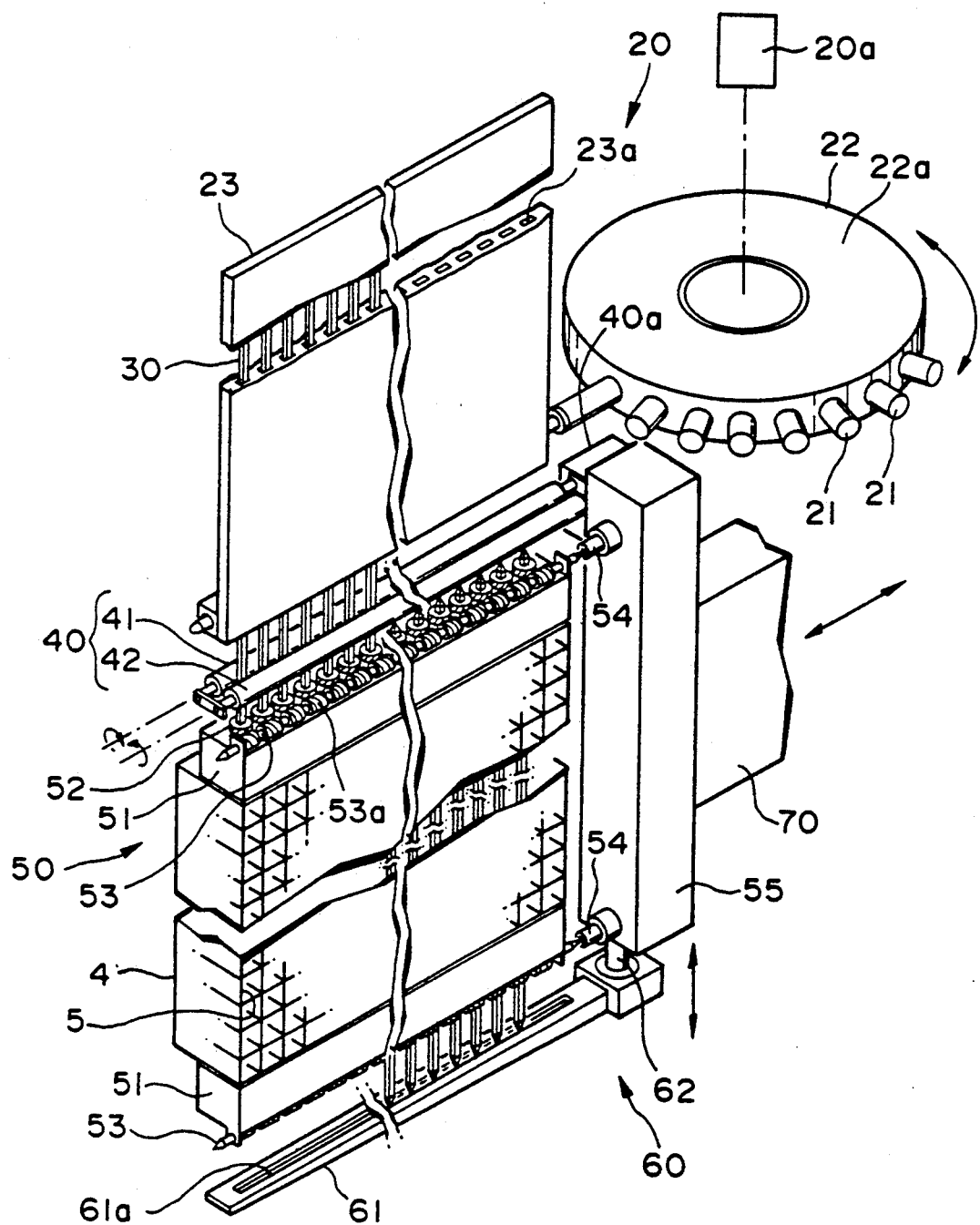
FIG. 1 is a perspective view of an apparatus for attaching a key member to a nuclear fuel assembly grid and detaching the same therefrom, in accordance with a first embodiment of the present invention.

FIG. 1 depicts an apparatus for attaching a key member to a nuclear fuel assembly grid and detaching the same therefrom, in accordance with a first embodiment of the present invention. The apparatus is disposed adjacent to a facility for assembling a nuclear fuel assembly, and comprises: a supply and recovery mechanism 20 or means for supplying key members 30 to a prescribed position adjacent to a grid 4 and recovering the same; an inserting and removing mechanism or means for inserting the key members 30 supplied by the supply and recovery mechanism 20 into the grid 4 and removing the key members 30 from the grid 4 to recover the same to the supply and recovery mechanism 20; and a rotating mechanism 50 or means for rotating the key members 30 inserted in the grid 4 in prescribed directions about their longitudinal axes, respectively, to attach the same to the grid and rotating the same in directions opposite to the aforesaid prescribed directions to detach the same from the grid 4.

The supply and recovery mechanism 20 comprises a disc shaped rotary stocker 22 and a generally rectangular shaped key magazine 23 adapted to be secured thereto for holding a plurality of elongated key members 30 vertically. The rotary stocker 22 includes a disc shaped body 22a having a vertically extending axis of rotation and a plurality of radially outwardly protruding shafts 21 mounted on an outer peripheral surface thereof in circumferentially spaced relation to one another. The disc shaped body 22a is operably connected to a suitable drive source 20a, so that the rotary stocker 22 is adapted to be rotated thereby about the vertical axis.

The key magazine 23 includes a plurality of, e.g., sixteen, vertically extending apertures opening to its bottom face for receiving the key members 30. Each aperture 23a releasably receives therein a single key member 30 so as to deflect the springs 10 on the grid. A suitable mechanism (not shown) for preventing key members 30 from falling as well as allowing the key members to fall at a prescribed timing is provided on the lower open ends of the apertures 23a of the magazine 23. This mechanism may be comprised of a hinged gate or sliding plate and is constructed so that it can be opened and closed at a desired timing.

The inserting and removing mechanism comprises a moving mechanism 40 or means arranged between the magazine 23 of the supply and recovery mechanism 20 and the grid 4, and includes an opposed pair of feed rollers 41 and 42 disposed parallel to each other so as to be perpendicular to the longitudinal axes of the key members 30, and a drive mechanism 40a operably connected to the rollers 41 and 42 for rotating each of the rollers in reverse directions.

The rotating mechanism 50 includes a pair of upper and lower support members 51 of a rectangular parallelepiped shape arranged at upper and lower sides of a grid 4 which is laid horizontally. Each support member 51 includes a plurality of vertically extending apertures (not shown) formed therethrough so as to correspond to the positions of the key members 30 held by the key magazine 23. The key member is formed of a plate so as to have a strip-like cross-section, and each aperture is formed in an elongated shape so that the key member is prevented from moving angularly when inserted. A plurality of disc shaped worm wheels 52 each having a through aperture formed at an axis thereof for receiving a respective key member 30 are rotatably mounted on each of the support members 51 through suitable connecting means. In addition, a pair of upper and lower horizontal shafts 53, each of which has a plurality of worms 53a formed thereon, are rotatably mounted on the upper and lower support members 51, respectively, such that each worm 53a is held in engagement with a respective worm wheel 52. Furthermore, a gear box 55 having therein a gear assembly and a suitable drive device such as a motor is mounted on a forward end of an arm 70 which is constructed so as to be movable toward and away from the grid 4. In addition, a pair of upper and lower rotatable holders 54 of a cylindrical shape for releasably holding one ends of the shafts 53 are mounted on one side of the gear box 55 so as to be operably connected to the gear assembly therein.

The inserting and removing mechanism further includes a discharging mechanism 60 arranged under the lower support member 51, and comprises an elongated push-out plate 61 having an upper groove 61a formed therein so as to extend longitudinally thereof, and an actuator 62 such as a pneumatic cylinder connected to one longitudinal end of the plate 61 for moving the plate 61 vertically.

Next, the operation of the apparatus of the aforesaid embodiment will be explained.

The key magazine 23 in which the key members 30 are received is attached to one of the protruding shafts 21 of the rotary stocker 22, and the rotary stocker 22 is rotated through a prescribed angle about its axis to position the aforesaid magazine 23 above the grid 4. Then, the suitable key member-falling inhibiting mechanism is operated to cause the key members 30 to fall, whereby the forward ends of the key members 30 are brought into contact with the upper faces of the feed rollers 41 and 42. Subsequently, each of the feed rollers 41 and 42 is rotated in different directions from each other, and each key member 30 is forced into the space between the feed rollers 41 and 42 and is moved downwards by the rotation of the rollers. In this manner, the key members 30 are made to pass through the through apertures of the upper support member 51, and are inserted into the grid 4. The keys thus inserted into the grid 4 are caused to move through the through holes in the lower supporting member 51 to be brought into abutment with the guide groove 61a of the plate 60, and finally stop there.

Thereafter, the rotating shafts 53 of the rotating mechanism 50 are secured to the holder 54, and the worms 53a are brought into engagement with the worm wheels 52, respectively. Then, the gear box 55 is activated to simultaneously rotate the upper and lower shafts 53 in the same direction to thereby rotate the key members 90 degrees about their axes through the worm wheels 52. The rotation of the key members 30 allows the springs 10 of the grid 4 to be deflected away from the opposing dimples. The foregoing operation is carried out on every grid 4 to be used for the construction of the nuclear fuel assembly.

The fuel rods are then inserted into the grids 4 while deflecting the springs 10 by the inserted key members 30. Thus, the nuclear fuel assembly can be assembled while preventing the fuel rods from abutting the springs 10, and the scratching is prevented from occurring.

After the completion of the insertion of all the fuel rods into the grids 4, the key members 30 are removed from the grids 4 in a manner as described below.

First, the actuator 62 of the discharging mechanism 60 is activated to lower the position of the elongated plate 61 to some extent. Then, the drive device in the gear box 55 of the rotating mechanism 50 is actuated to rotate the shafts 53 in opposite directions through the holders 54, and the key members are rotated 90 degrees by the worm wheels 52. Thus, the key members 30 are brought back to the initial position and disengage from the springs 10 of the grids 4, so that the key members 30 fall until the lower ends thereof are held in contact with the guide groove 61a of the elongated plate 61.

Thereafter, the actuator 62 is activated to elevate the elongated plate 61 to move the key members 30 upwards. Thus, the upper ends of the key members 30 are brought into the lower ends of the feed rollers 41 and 42.

Then, the drive mechanism 40a is activated to rotate the feed rollers 41 and 42 in reverse directions opposite to the previous rotating directions. As a result, the key members 30 are moved upwards to be received in the apertures 23a of the magazine 23. Subsequently, while preventing the key members 30 from falling by means of the falling-inhibiting mechanism, the rotary stocker 22 is activated to move the key member-magazine 23 away from the grid 4.

After the completion of insertion or removal of the key members, the shafts 53 are removed from the holders 54, and the gear box 55 is moved back to an initial position by operating the arm 70.

Thus, in the apparatus of the invention, the attaching and detaching operation of a number of key members 30 can be easily carried out at one time. Therefore, the efficiency of the task of inserting and detaching the key members 30 can be substantially improved compared with the manual operation.

In FIG. 1, a half of the key members 30 are elevated while the others are shown as being moved downwards. However, this is simply for the illustration, and in actual situation, all the key members 30 are simultaneously moved up and down. Furthermore, although in the above illustrated embodiment, the supply and recovery mechanism 20 is constructed so as to have a rotary stocker and a magazine, any modification is possible to the construction as long as the modified mechanism can forward the key members 30 to the inserting mechanism.

Figure 2:
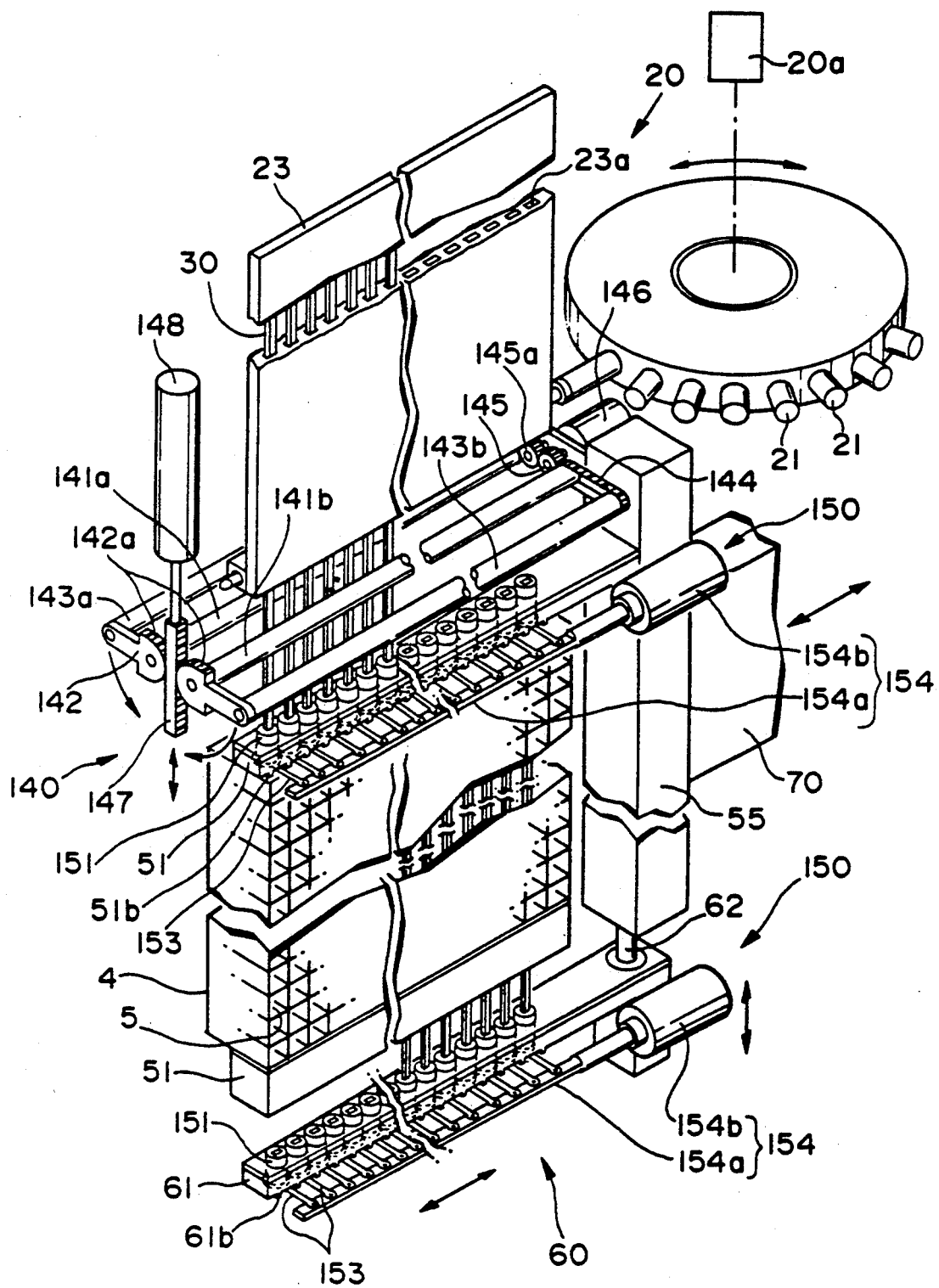
FIG. 2 is a view similar to FIG. 1, but showing an apparatus in accordance with a second embodiment of the invention.
Figure 3:
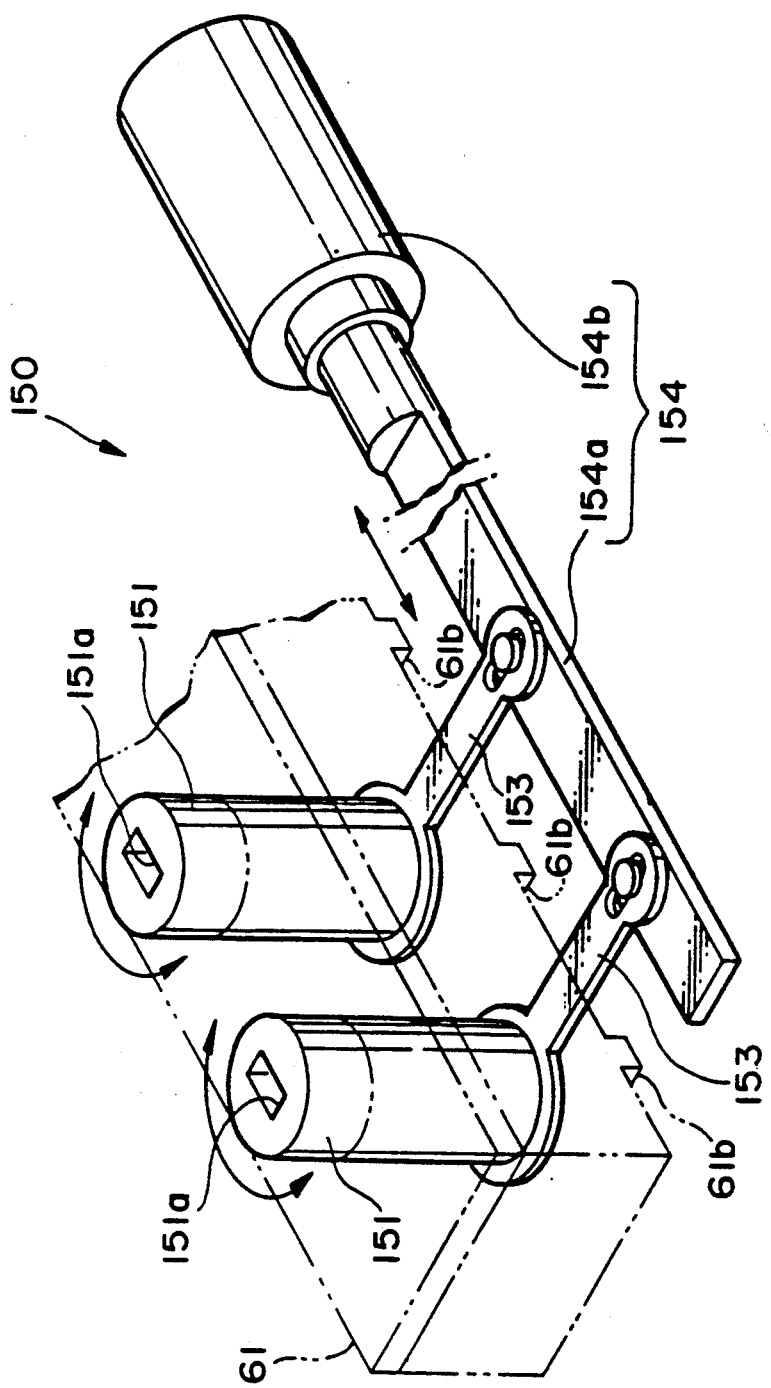
FIG. 3 is an enlarged view of a part of the apparatus of FIG. 2.
Figure 4:
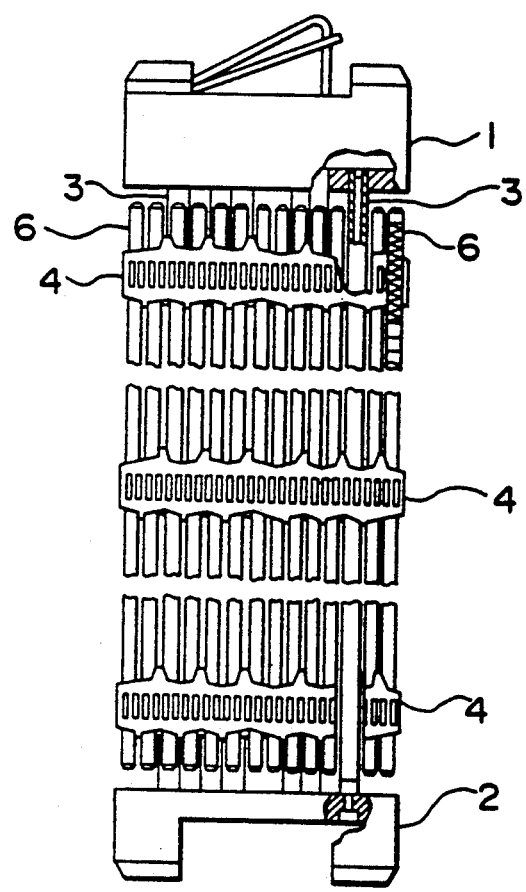
FIG. 4 is a front elevational view of a conventional nuclear fuel assembly.
Figure 5:
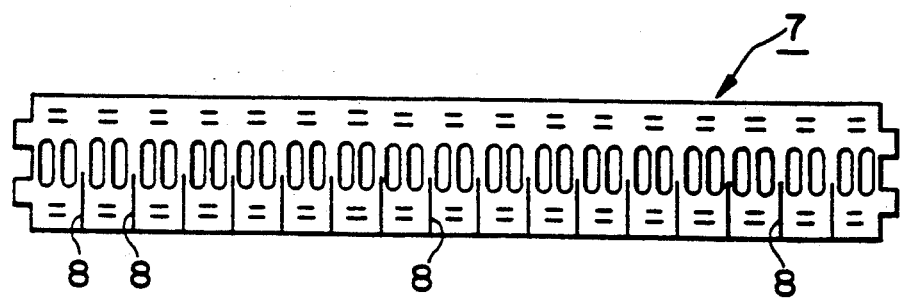
FIG. 5 is a front elevational view of a strap used to form a grid for the nuclear fuel assembly.
Figure 6:
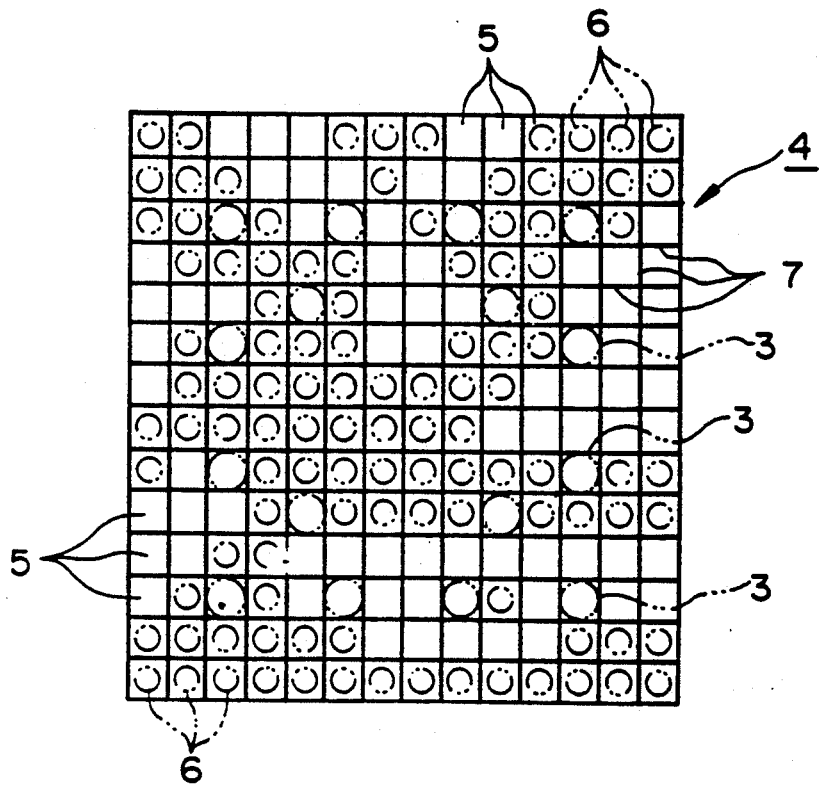
FIG. 6 is a plan view showing the state in which fuel rods are inserted in grid cells of the grid.
Figure 7:
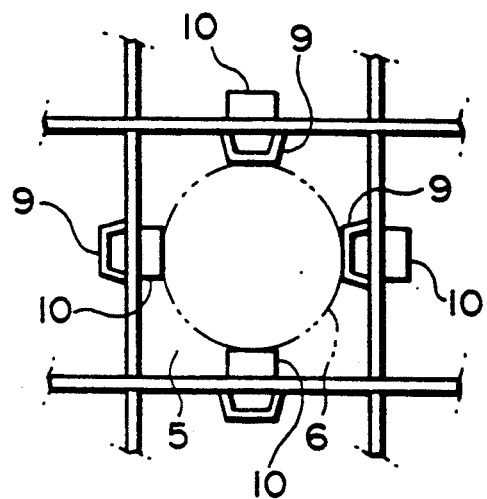
FIG. 7 is an enlarged view of a part of FIG. 6.

FIGS. 2 and 3 depict an apparatus for attaching and detaching a key member in a nuclear fuel assembly grid in accordance with a second embodiment of the present invention, in which the parts or members common with those of the previous embodiment are designated by the same numerals to simplify the explanation thereof.

The apparatus differs from that of the previous embodiment in that the insertion mechanism of the inserting and removing mechanism 40 is replaced by a modified insertion mechanism 140, and that the rotating mechanism 50 is replaced by a modified rotating mechanism 150.

First, the insertion mechanism 140 includes two rotatable horizontal support rods 141a and 141b arranged parallel to each other so as to extend perpendicular to the axes of the key members 30, thereby forming a space therebetween through which the key members 30 are conveyed. A pair of feed rollers 143a and 143b are arranged parallel to and outside the support rods 141a and 141b, respectively, through a pair of support plates 142, and an endless timing belt 144 is wound on a respective support rod 141a or 141b and a respective feed roller 143a or 143b disposed adjacent thereto. One end of each support plate 142 is rotatably mounted on a respective support rod, while the other end of the support plate is fixedly secured to the same rod. In addition, arranged adjacent to one ends of the support rods 141a and 141b is an electric motor 146 which includes on its output shaft a first pulley 145 to be engaged with the aforesaid belt 144 wound on one pair of the support rod 141b and the feed roller 143b. Furthermore, a second pulley 145a is interposed between the first pulley 145 on the output shaft of the motor and the belt (not shown) which is wound on the other pair of the support rod 141a and the feed roller 143a.

Moreover, a drive cylinder 148 is arranged adjacent to the other ends of the support rods 141a and 141b with its cylinder rod being arranged so as to extend downwards. A rack 147 having gear teeth formed on opposite sides thereof is mounted on the cylinder rod such that the gear teeth on the opposite sides are directed toward the opposed ends of the support rods, respectively. In addition, pinion gear teeth 142a to be engaged with the gear tooth of the rack 147 are formed on the outer surfaces of the ends of the support plates 142 which are disposed in opposed relation to each other. With the above construction, the rollers are caused to move toward and away from each other between a proximity position, in which the rollers engage the key members to move the same, and a distal position in which the rollers do not engage the key members.

The modified rotating mechanism 150 includes a plurality of upper cylindrical holding members 151 mounted on the upper support member 51, and a plurality of lower cylindrical holding members 151 mounted on the elongated push-out plate 61. Each holding member 151 is rotatably disposed so as to correspond in its position to a respective key member 30, and has a through aperture 151a through which the key member 30 is inserted. The key member is formed of a plate so as to have a strip-like cross-section, and the through aperture is formed in an elongated shape so that the key member is prevented from moving angularly when inserted.

A drive mechanism 154 is operably connected to the holding members 151 for rotating the holding members 151 by a prescribed angle. The drive mechanism 154 includes a pneumatic cylinder device 154b having an elongated plate-like portion 154a formed at a cylinder rod thereof. A plurality of links 153 each having an annular one end are rotatably secured at the other ends to the plate-like portion 154a, and the annular end of each link 153 is fitted on a respective one of the holding members 151. As will be seen from FIG. 2, the upper pneumatic cylinder device is securely fixed to the side wall of the gear box 55, whereas the lower pneumatic cylinder device is immovably disposed on the side face of the base of the elongated plate 61. Furthermore, a plurality of stoppers 51b and 61b are mounted on both the lower face of each of the upper support member 51 and the elongated plate 61, whereby the angular movement of each link is limited within about 90 degrees.

Next, the operation of the apparatus of the second embodiment will be described. The magazine 23 is first moved to a position above the grid 4, and then the cylinder device 148 is actuated to move the rack 147 upwards, thereby rotating the support plate 142 to move the feed rollers 143a and 143b towards each other. Then, when the feed rollers 143a and 143b have approached each other so that the space therebetween is generally identical to the width of the key member 30, the driving of the cylinder device 148 is stopped.

Subsequently, as is the case with the first embodiment, the key member 30 is moved downwards from the magazine 23 to bring the lower ends of the key members 30 into abutment with the upper faces of the feed rollers 143a and 143b. Then, the motor 146 is activated to rotate the feed rollers 143a and 143b in reverse directions through the gears 145 and the belts 144. As a result, the key members 30 are moved through the holding members 151 of the upper rotating mechanism 150 in a downward direction.

Furthermore, in the illustrated embodiment, when the key members 30 are inserted into the grid 4 to some extent, the cylinder device 148 is actuated to move the rack 147 downwards, to thereby move the rollers 143a and 143b away from the key members 30. Therefore, even though the key members 30 are not completely inserted into the grid, the key members 30 can be rotated by actuating the rotating mechanism 50. Accordingly, the work of inserting the key members 30 into the grid 4 becomes easy, enhancing the efficiency of the work.

When the key members 30 are moved sufficiently downwards, the lower ends of the key members are fitted into the fitting slits 151a formed in the holding members 151. In this condition, the motor 146 is stopped, and the cylinder device 148 is activated to move the feed rollers 143a and 143b upwards to the initial position. Subsequently, the key members 30 are rotated by means of the upper and lower rotating mechanisms 150.

More specifically, the upper and lower pneumatic cylinder devices 154b are driven, and the elongated plates 154a are caused to move along their elongated direction. With this procedure, the holding members 151 are rotated through the link mechanisms 153, and the key members 30 fitted thereinto are rotated. In this connection, the operations of the upper and lower pneumatic cylinder devices 154b are synchronously carried out so that no twisting occurs in the key members 30.

In the illustrated apparatus, inasmuch as the stoppers 61b are provided on the lower face of the elongated plate 61, the undue rotation of the links 153 can be prevented.

In the foregoing, it is preferable that the slit 151a of the lower holding member 151 be open only at its upper side. With this construction, the positioning of the key members 30 can be carried out by bringing the lower ends of the key members 30 into engagement with the holding members 151.

Obviously, many modifications and variations of the present invention are possible in the light of the above teachings. It is therefore to be understood that within the scope of the appended claims, the invention may be practiced otherwise than as specifically described.

What is claimed is:

1. An apparatus for attaching a key member to a nuclear fuel assembly grid and detaching the same therefrom, said key member having a longitudinal axis and being adapted to be detachably attached to the grid by rotating the same about the longitudinal axis, said apparatus comprising:

(a) supply and recovery means for supplying the key member to a prescribed position adjacent to the grid and recovering the same;
   (b) inserting and removing means disposed between said supply and recovery means and said grid for inserting the key member supplied from said supply and recovery means into the grid and removing the key member from the grid to recover the same to said supply and recovery means; and
   (c) rotating means disposed adjacent to said inserting and removing means for rotating the key member inserted in the grid in a prescribed direction about said longitudinal axis to attach the same to the grid and rotating the same in a direction opposite to said prescribed direction to detach the same from the grid.

2. An apparatus according to claim 1, wherein said inserting and removing means includes an opposed pair of rollers disposed parallel to each other so as to define a space therebetween, and drive means operably connected to said rollers for rotating the rollers in reverse directions, said space between said rollers being such that when said rollers are rotated, said rollers engage the key member to move the same toward and away from the grid.

3. An apparatus according to claim 2, wherein said inserting and removing means further includes discharging means for moving the key member to bring the same into the space between said rollers.

4. An apparatus according to claim 2, wherein said rollers are disposed movable toward and away from each other between a proximity position, in which the rollers engage the key member to move the same, and a distal position in which the rollers do not engage the key member.

5. An apparatus according to claim 4, wherein said inserting and removing means further includes drive means connected to said rollers for moving said rollers between said proximity position and said distal position.

6. An apparatus according to claim 1, wherein said rotating means includes a worm wheel having an aperture formed therethrough for receiving the key member, a worm gear held in engaged with said worm wheel, and an actuator for rotating said worm gear.

7. An apparatus according to claim 1, wherein said rotating means includes a holding member having an aperture formed therethrough for receiving the key member, a link mechanism connected to said holding member, and an actuator for rotating said holding member through said link mechanism.

* * * * *